US012752601B2

(12) United States Patent
Itou et al.

(10) Patent No.: US 12,752,601 B2
(45) Date of Patent: Oct. 6, 2026

(54) OFF-ROAD VEHICLE

(71) Applicant: KAWASAKI MOTORS, LTD., Hyogo (JP)

(72) Inventors: Kouji Itou, Akashi (JP); Hiromasa Kurioka, Akashi (JP); Minoru Kobayashi, Akashi (JP); Hidenori Kikuchi, Akashi (JP)

(73) Assignee: KAWASAKI MOTORS, LTD., Hyogo (JP)

( * ) Notice: Subject to any disclaimer, the term of this patent is extended or adjusted under 35 U.S.C. 154(b) by 448 days.

(21) Appl. No.: 18/451,742

(22) Filed: Aug. 17, 2023

(65) Prior Publication Data

US 2025/0058604 A1 Feb. 20, 2025

(51) Int. Cl.

*B60H 1/24* (2006.01)
*B60N 2/005* (2006.01)
*B62D 25/20* (2006.01)

(52) U.S. Cl.

CPC ............. *B60H 1/242* (2013.01); *B60N 2/005* (2013.01); *B62D 25/20* (2013.01)

(58) Field of Classification Search

CPC ...... B62D 25/20; B60N 2/005; B60N 2/5628; B60H 1/24; B60H 1/246; B60H 1/247; B60H 2001/002; B60H 1/00407; B60H 1/00414; B60H 2001/00721; B60H 2001/00185
USPC .......................................................... 296/208
See application file for complete search history.

(56) References Cited

U.S. PATENT DOCUMENTS 2,344,864 A * 3/1944 Griswold ........... B60H 1/00207 454/75
2,720,149 A * 10/1955 Le Blond ............... B60H 1/247 454/159
6,857,955 B1 * 2/2005 Held ........................ B60H 1/00 454/144
6,902,020 B2 * 6/2005 Kronner .................. B60R 16/04 180/68.5
9,126,477 B2 * 9/2015 Zhu ........................ B60N 2/646
11,192,445 B2 * 12/2021 Kano ....................... B60K 1/04
2001/0032476 A1 * 10/2001 Kampf ..................... B60H 1/32 62/244
2007/0205623 A1 * 9/2007 Hung ........................ B60R 7/04 296/208
2008/0296935 A1 * 12/2008 Mangiapane ....... H01M 10/625 296/63
2011/0186560 A1 * 8/2011 Kennedy .............. B60N 2/5657 219/217
2015/0140915 A1 * 5/2015 Rawlinson ............... B60N 2/56
2021/0214022 A1 * 7/2021 Schounard ............. B62D 31/00
2021/0245602 A1 8/2021 Tanaka et al.
2022/0288994 A1 9/2022 Harmon et al.

FOREIGN PATENT DOCUMENTS

DE 102009022847 B4 * 4/2018 ............... B60H 1/00

* cited by examiner

*Primary Examiner* — Carly W. Lynch
(74) *Attorney, Agent, or Firm* — Studebaker Brackett PLLC

(57) ABSTRACT

A utility vehicle 100 includes a front seat 1 and a rear seat 2, and a front panel 31 located below a seat cushion 1*t* of the front seat 1 and extending upward and in a vehicle width direction from a floor 8. The front panel 31 has an air hole 35 through which conditioned air flowing rearward from a position in front with respect to the front seat 1 passes.

11 Claims, 8 Drawing Sheets

OFF-ROAD VEHICLE

FIELD

The technique disclosed herein relates to an off-road vehicle.

BACKGROUND

U.S. Patent Publication No. 2021/0245602 discloses a structure in which conditioned air is supplied through an air outlet in front with respect to a front seat. The conditioned air supplied through the air outlet adjusts the temperature of a vehicle interior.

SUMMARY

In a case where the conditioned air is supplied through the air outlet in front with respect to the front seat, the conditioned air easily reaches the front seat, but is less likely to reach a rear seat.

The technique disclosed herein has been made in view of the above-described point, and an object thereof is to improve an air-conditioning effect for a rear seat.

An off-road vehicle disclosed herein includes a front seat and a rear seat, and a panel located below a seat cushion of the front seat and extending upward and in a vehicle width direction from a floor, and the panel has an air hole through which conditioned air flowing rearward from a position in front with respect to the front seat passes.

The off-road vehicle can improve an air-conditioning effect for the rear seat.

DESCRIPTION OF EMBODIMENTS

Figure 1:
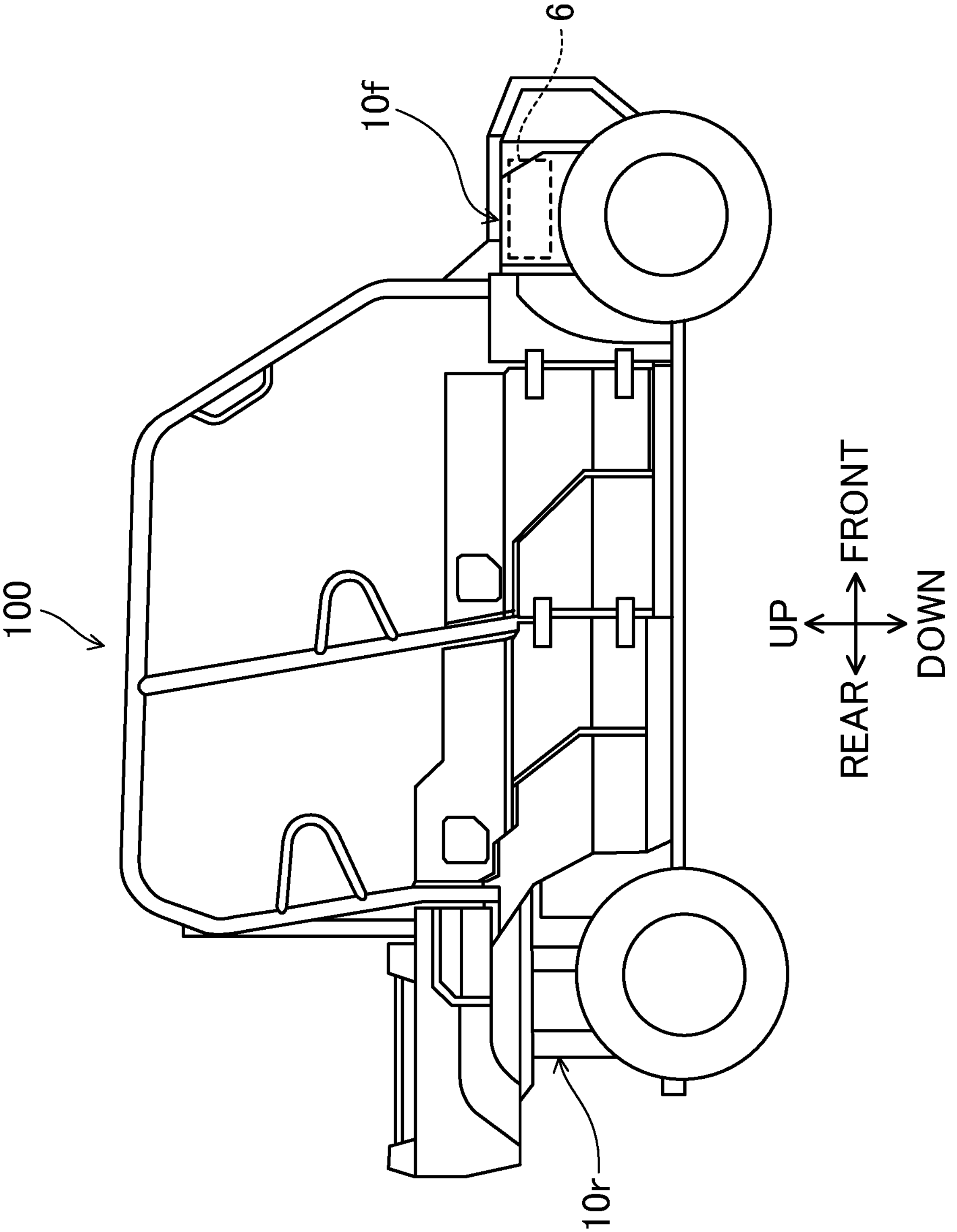
FIG. 1 is a side view of a utility vehicle.

Hereinafter, an exemplary embodiment will be described based on the drawings. FIG. 1 is a side view of a utility vehicle 100.

The utility vehicle 100 is a four-wheeled vehicle which can travel off road. The utility vehicle 100 is one example of an off-road vehicle. Hereinafter, the utility vehicle 100 will also be merely referred to as a "vehicle 100."

In the present disclosure, each component of the vehicle 100 will be described using a direction with respect to the vehicle 100. Specifically, a "front" means the front of the vehicle 100 in a vehicle front-rear direction, and a "rear" means the rear of the vehicle 100 in the vehicle front-rear direction. A "left" means the left when facing the front of the vehicle 100, and a "right" means the right when facing the front of the vehicle 100. Note that a right-left direction will also be referred to as a "vehicle width direction." In the present disclosure, a case of a member extending in a certain direction includes not only a case of the member precisely extending in parallel with the certain direction, but also a case of the member substantially extending in the certain direction.

Figure 2:
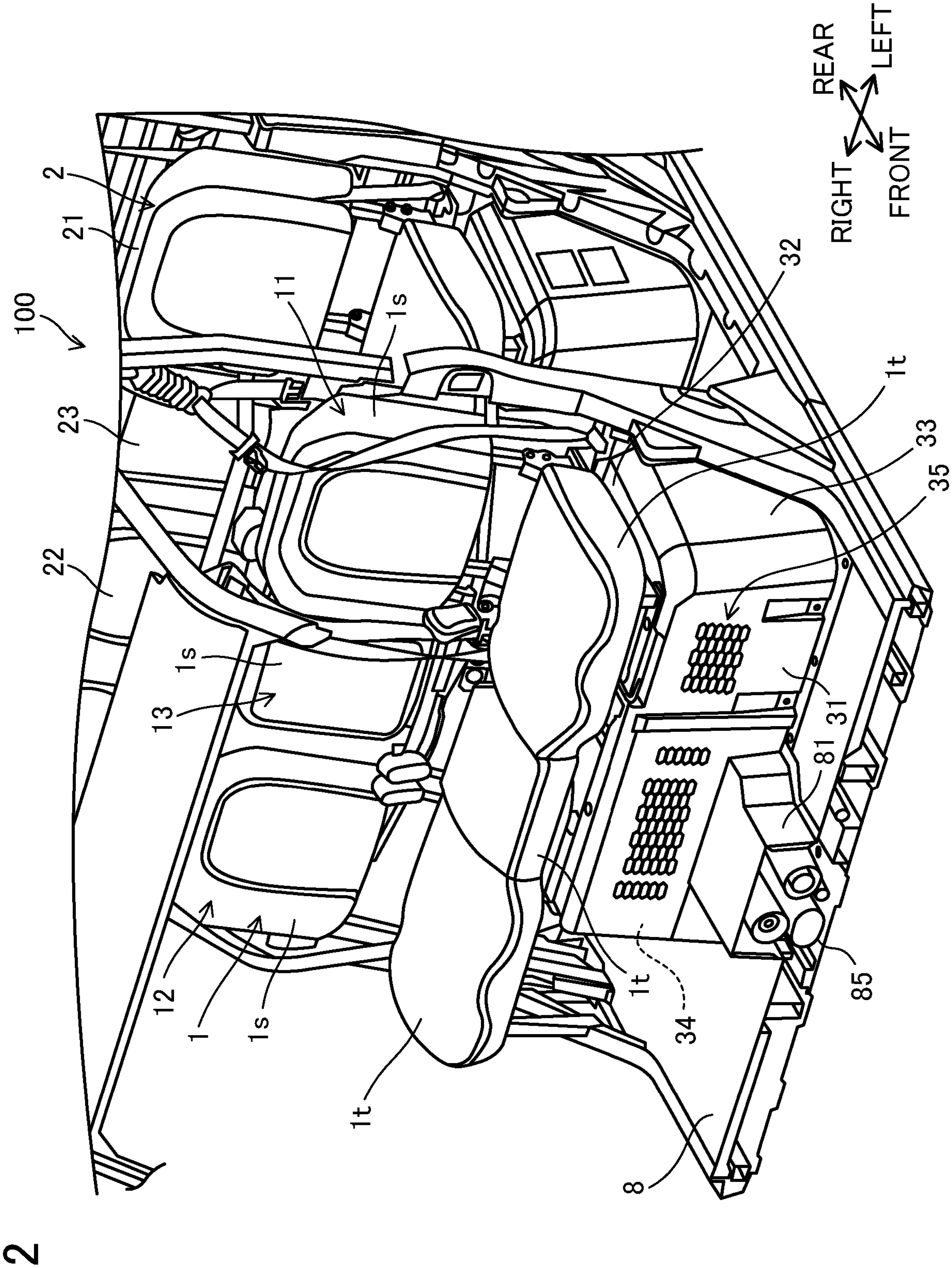
FIG. 2 is a perspective view of a vehicle interior from the left front.

FIG. 2 is a perspective view of the interior of the vehicle 100 from the left front. The vehicle 100 includes a front seat 1, a rear seat 2, and a front panel 31 located below the front seat 1. The front panel 31 is one example of a panel. The vehicle 100 may further include a top panel 32, a left side panel 33, and a right side panel 34 located below the front seat 1. The vehicle 100 may further include a center tunnel 81 in a floor 8. The center tunnel 81 houses, for example, an intake duct 85 of an engine. The center tunnel 81 is located at the center in the vehicle width direction, and extends in the front-rear direction.

The front seat 1 includes a driver seat 11 and a passenger seat 12. In this example, the front seat 1 further includes a center seat 13 between the driver seat 11 and the passenger seat 12. That is, the front seat 1 includes three seats in line. The front seat 1 has a seat back 1*s* and a seat cushion 1*t*. That is, each of the driver seat 11, the passenger seat 12, and the center seat 13 has a seat back 1*s* and a seat cushion 1*t*.

The rear seat 2 is located in rear of the front seat 1. As in the front seat 1, the rear seat 2 includes three seats in line. That is, the rear seat 2 includes a left seat 21 located in rear of the driver seat 11, a right seat 22 located in rear of the passenger seat 12, and a center seat 23 located in rear of the center seat 13 of the front seat 1.

Figure 3:
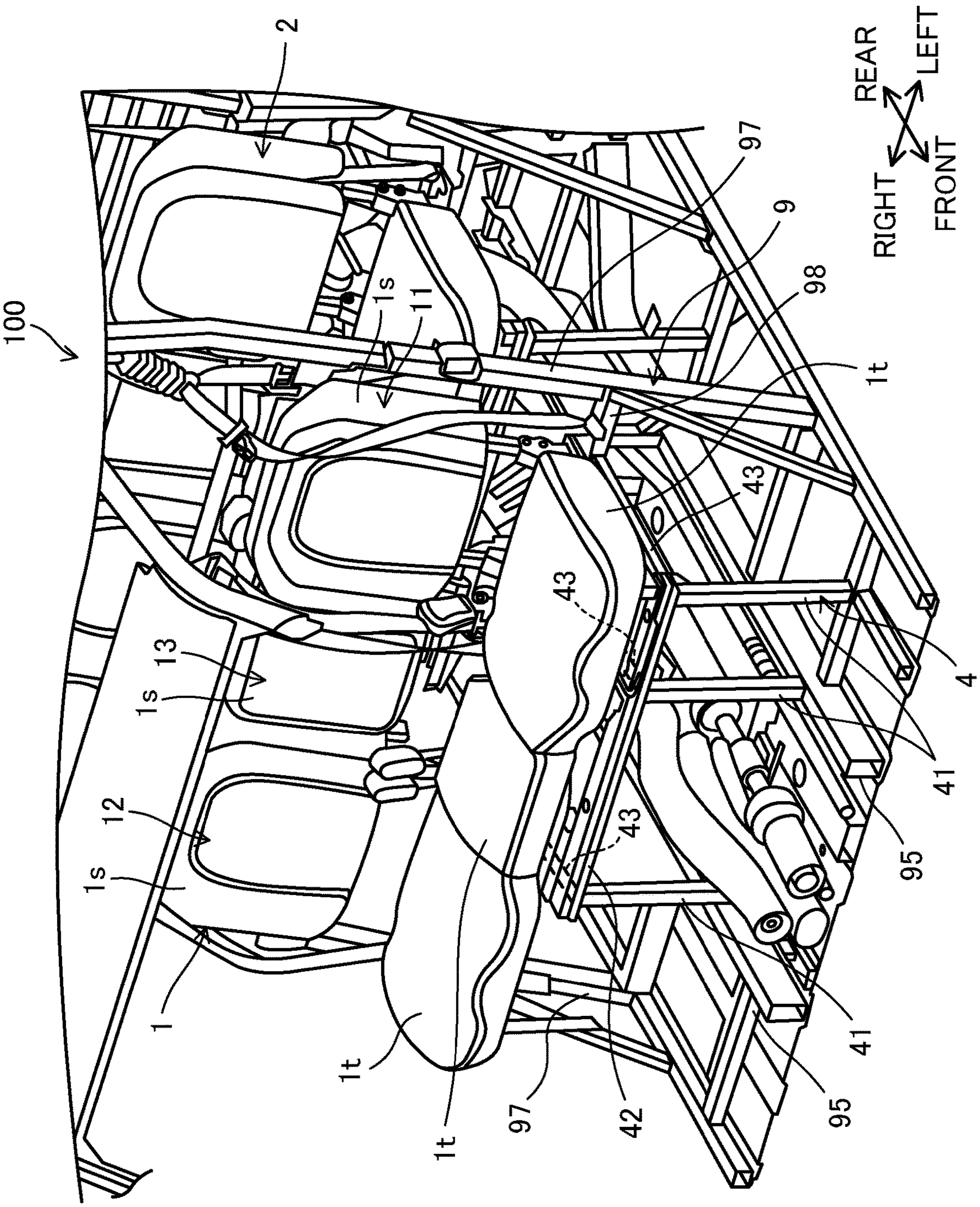
FIG. 3 is a perspective view of the partially-disassembled vehicle interior from the left front.

FIG. 3 is a perspective view of the partially-disassembled vehicle interior from the left front. Specifically, as compared to FIG. 2, the front panel 31, the top panel 32, the left side panel 33, the right side panel 34, and the floor 8 are not shown in FIG. 3. The vehicle 100 may further include a seat support frame 4 that supports the front seat 1. The seat support frame 4 is part of a vehicle body frame 9. The vehicle body frame 9 includes, in addition to the seat support frame 4, floor side members 95, two center pillars 97, and a cross member 98. The floor side members 95 are located below the floor 8 (see FIG. 2). Some of the floor side members 95 extend in the front-rear direction, and the other floor side members 95 extend in the vehicle width direction. The two center pillars 97 are aligned in the vehicle width direction, and extend in an upper-lower direction. In terms of a position in the front-rear direction, the two center pillars 97 are positioned between the front seat 1 and the rear seat 2. The cross member 98 extends in the vehicle width direction above the floor 8. One end of the cross member 98 in the vehicle width direction is coupled to one center pillar 97, and the other end of the cross member 98 in the vehicle width direction is coupled to the other center pillar 97.

The seat support frame 4 is located below the seat cushion 1*t* of the front seat 1. The seat support frame 4 is, for example, a metal pipe. The seat support frame 4 has first frames 41, a second frame 42, and third frames 43.

Each first frame 41 extends in the upper-lower direction. Specifically, each first frame 41 extends from the floor 8 (see FIG. 2) to the vicinity of the lower end of the seat cushion 1*t*. The lower end of each first frame 41 is coupled to the floor side member 95. The first frames 41 are aligned in the vehicle width direction. Specifically, the first frames 41 are aligned in the vehicle width direction below the seat cushion 1*t*. In terms of a position in the vehicle width direction, the first frame 41 located on the leftmost side is positioned slightly on the right side with respect to the left end of the seat cushion 1*t* of the driver seat 11. In terms of a position in the vehicle width direction, the first frame 41 located on the rightmost side is positioned slightly on the right side with respect to the right end of the seat cushion 1*t* of the center seat 13. In terms of a position in the front-rear direction, the position of each first frame 41 is substantially coincident with the position of the front end of the seat cushion 1*t* of the front seat 1. In this example, the number of first frames 41 is three. The second frame 42 extends in the vehicle width direction. Specifically, the second frame 42 extends in the vehicle width direction below the seat cushion 1*t*. In this example, the second frame 42 extends from a position slightly on the right side with respect to the left end of the seat cushion 1*t* of the driver seat 11 to a position slightly on the right side with respect to the right end of the seat cushion 1*t* of the center seat 13. The second frame 42 is coupled to the upper end of each first frame 41.

Each third frame 43 extends in the front-rear direction. Specifically, each third frame 43 extends from the front end to the rear end of the seat cushion 1*t* of the front seat 1. The third frames 43 are aligned in the vehicle width direction. Specifically, the third frames 43 are aligned in the vehicle width direction below the seat cushion 1*t*. The front end of each third frame 43 is coupled to a coupling portion between corresponding first frame 41 and the second frame 42. The rear end of each third frame 43 is coupled to the cross member 98. In this example, the number of third frames 43 is three.

As described above, the seat support frame 4 is fixed to the floor side members 95 and the cross member 98. The seat cushion 1*t* of the front seat 1 is attached to the second frame 42 and the third frames 43 of the seat support frame 4. With this configuration, the front seat 1 is supported on the seat support frame 4. In this example, the seat support frame 4 is located below the seat cushion 1*t* of the driver seat 11 and the seat cushion 1*t* of the center seat 13, and is located partially below the seat cushion 1*t* of the passenger seat 12.

Figure 4:
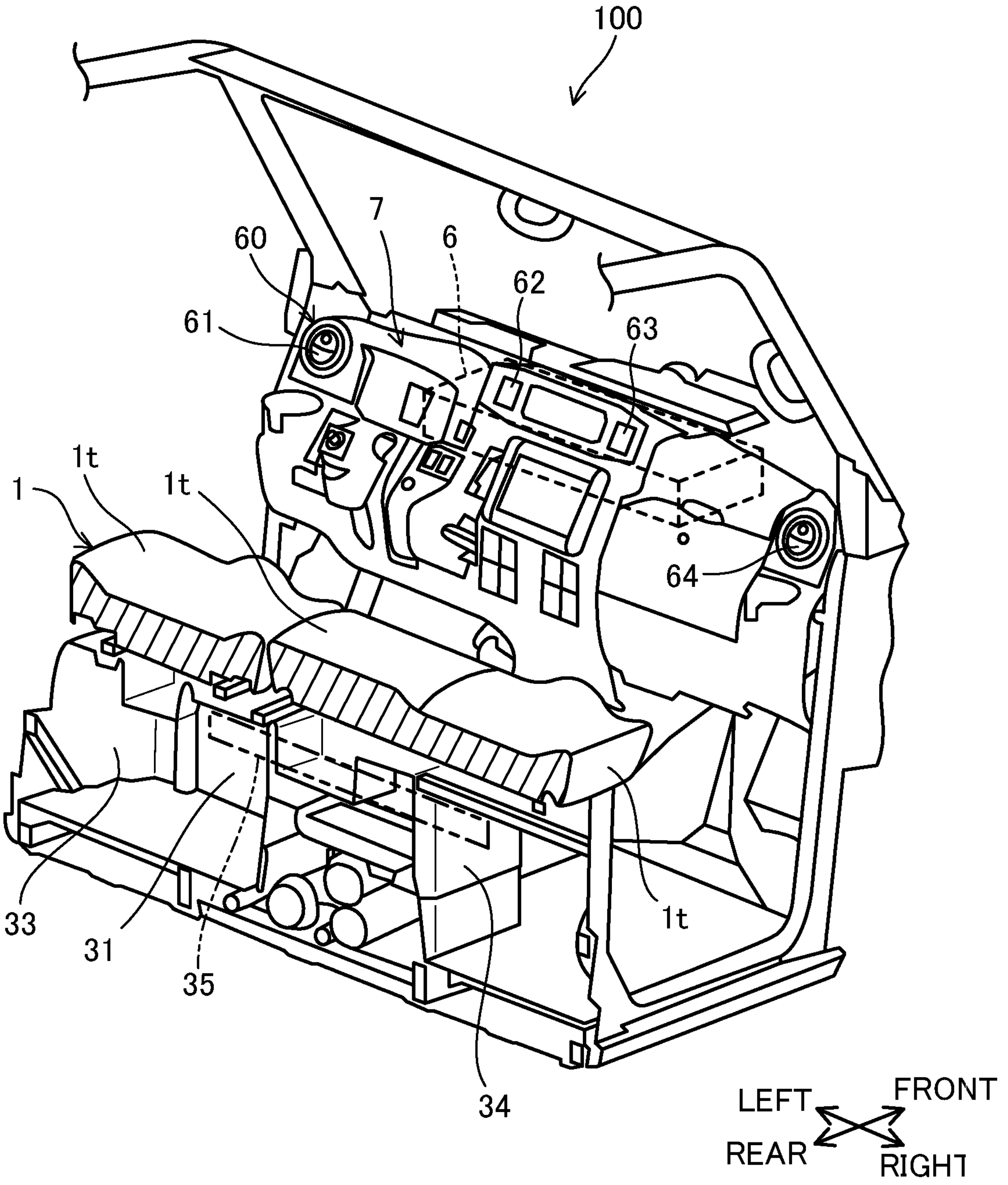
FIG. 4 is a perspective view of the vehicle interior from the right rear with the vehicle interior cut along a plane perpendicular to a front-rear direction.

FIG. 4 is a perspective view of the vehicle interior from the right rear with the vehicle interior cut along a plane perpendicular to the front-rear direction. The vehicle 100 may further include an air-conditioner 6 and an air outlet 60 located in front with respect to the front seat 1. The air-conditioner 6 supplies conditioned air into the vehicle interior through the air outlet 60. That is, the conditioned air flows rearward from a position in front with respect to the front seat 1. The air-conditioner 6 is, for example, a heat pump air-conditioner. The air-conditioner 6 has a compressor that compresses refrigerant, a condenser that exchanges heat between refrigerant and air, a pipe in which refrigerant flows, etc. The air-conditioner 6 has, for example, a cooling function of cooling air and a heating function of heating air. The air-conditioner 6 is housed in at least one of a front room 10*f* (see FIG. 1) in front in the vehicle interior or a rear room 10*r* (see FIG. 1) in rear in the vehicle interior. For example, the condenser of the air-conditioner 6 is housed in the front room 10*f*. The compressor of the air-conditioner 6 is housed in the rear room 10*r*.

In this example, the air outlet 60 includes a first air outlet 61, a second air outlet 62, a third air outlet 63, and a fourth air outlet 64. The first air outlet 61, the second air outlet 62, the third air outlet 63, and the fourth air outlet 64 are located in an instrument panel 7. The first air outlet 61, the second air outlet 62, the third air outlet 63, and the fourth air outlet 64 are aligned in the vehicle width direction. Specifically, the first air outlet 61 is located at the left end of the instrument panel 7. The second air outlet 62 is located slightly on the left side with respect to the center of the instrument panel 7. The third air outlet 63 is located slightly on the right side with respect to the center of the instrument panel 7. The fourth air outlet 64 is located at the right end of the instrument panel 7.

The front panel 31 has a decorative panel function of hiding the seat support frame 4 from an occupant. The front panel 31 is, for example, made of resin. As shown in FIG. 2, the front panel 31 is located below the seat cushion 1*t* of the front seat 1. The front panel 31 extends upward and in the vehicle width direction from the floor 8. The front panel 31 has a plate shape. The front panel 31 divides a space below the front seat 1 in the front-rear direction. That is, the front panel 31 divides the space below the front seat 1 into a space in front with respect to the front panel 31 and a space in rear with respect to the front panel 31.

Figure 5:
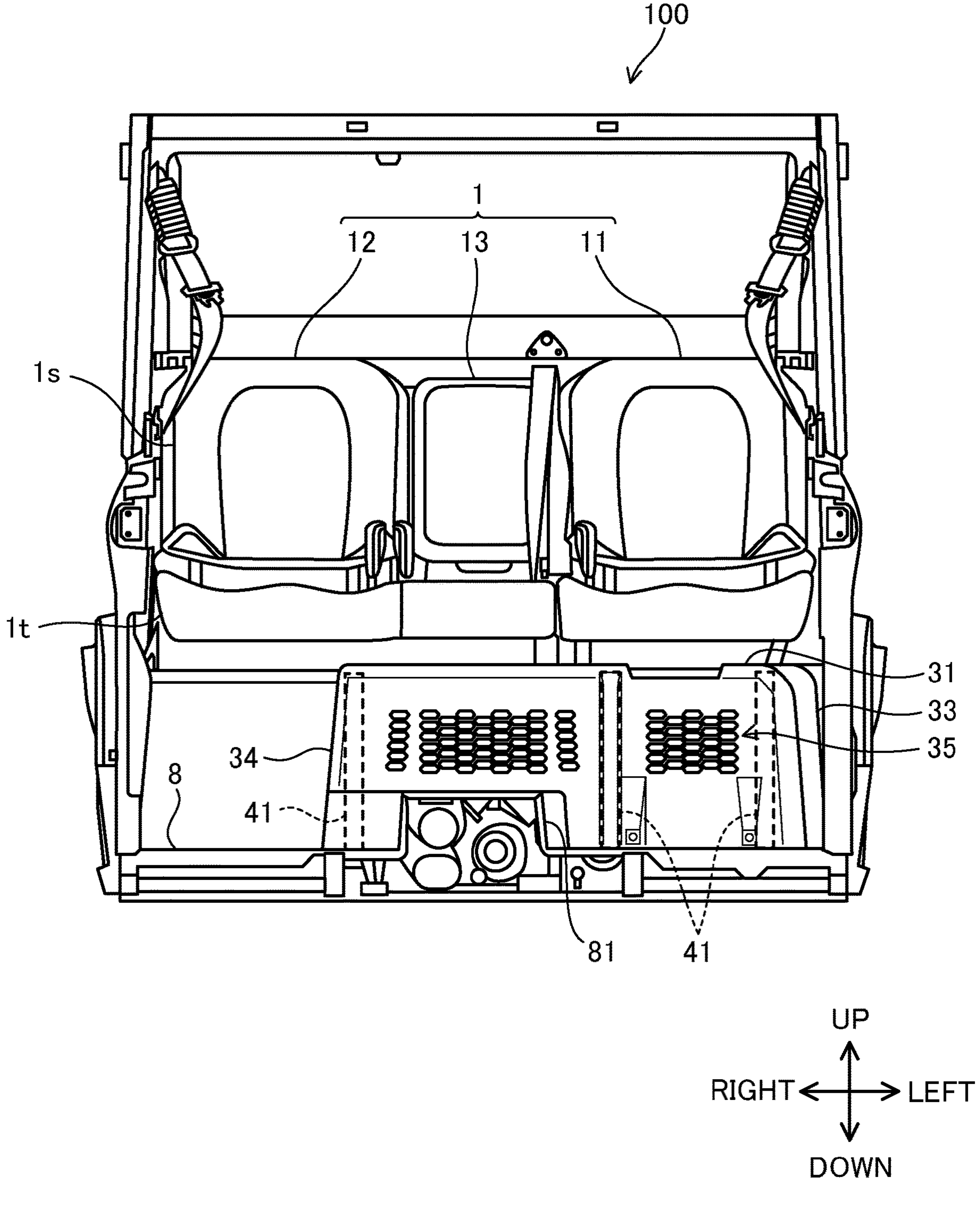
FIG. 5 is a front view of the vehicle interior from the front.

FIG. 5 is a front view of the vehicle interior from the front. Specifically, the front panel 31 extends in the upper-lower direction from the floor 8 to a position between the lower end of the seat cushion 1*t* of the front seat 1 and the upper ends of the first frames 41. The front panel 31 extends in the vehicle width direction from a position in left with respect to the first frame 41 located on the leftmost side to a position in right with respect to the first frame 41 located on the rightmost side. The front panel 31 is located below the seat cushion 1*t* of the driver seat 11 and the seat cushion 1*t* of the center seat 13, and is located partially below the seat cushion 1*t* of the passenger seat 12. That is, a space communicating in the front-rear direction and having a height from the floor 8 to the lower end of the seat cushion 1*t* of the passenger seat 12 is present below the seat cushion 1*t* of the passenger seat 12. Specifically, in terms of a position in the vehicle width direction, the front panel 31 overlaps with the air outlet 60 (specifically, first air outlet 61, second air outlet 62, and third air outlet 63) as shown in FIG. 4. That is, conditioned air supplied through the air outlet 60 easily reaches the front panel 31. More specifically, in terms of a position in the vehicle width direction, a later-described air hole 35 of the front panel 31 overlaps with the air outlet 60 (specifically, second air outlet 62 and third air outlet 63). Note that in FIG. 4, a region of the front panel 31 where the air hole 35 is located is indicated by a chain double-dashed line for the sake of convenience in description.

Figure 6:
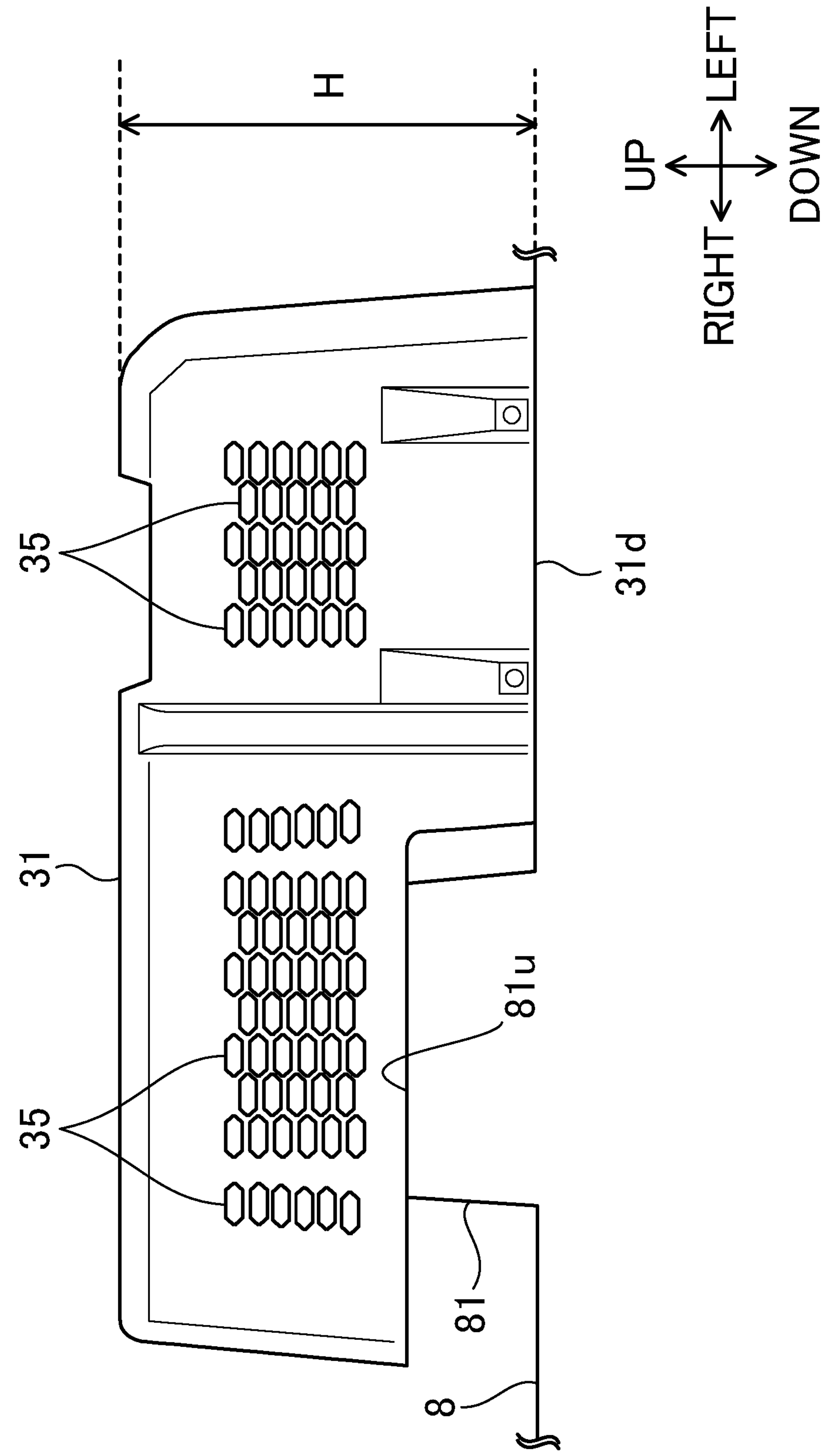
FIG. 6 is an enlarged view of a front panel.

FIG. 6 is an enlarged view of the front panel 31. The front panel 31 has the air hole 35 through which conditioned air flowing rearward from a position in front with respect to the front seat 1 (see FIG. 2) passes. Specifically, part of conditioned air supplied through the air outlet 60 (see FIG. 4) passes through the air hole 35. The air hole 35 penetrates the front panel 31 in the thickness direction thereof. In this example, the shape of the air hole 35 is substantially a hexagonal shape.

Specifically, the air hole 35 is positioned higher than a lower end 31*d* of the front panel 31 by ⅓ of the upper-lower dimension H of the front panel 31 or more. That is, no air hole 35 is located in a portion of the front panel 31 from the lower end 31*d* to a height of ⅓ of the upper-lower dimension H of the front panel 31. The upper-lower dimension H of the front panel 31 means the maximum upper-lower dimension of the front panel 31 in the vehicle width direction. Preferably, the air hole 35 is positioned higher than the lower end 31*d* of the front panel 31 by ½ of the upper-lower dimension H of the front panel 31 or more. That is, preferably, no air hole 35 is located in a portion of the front panel 31 from the lower end 31*d* to a height of ½ of the upper-lower dimension H of the front panel 31. Alternatively, in terms of a position in the upper-lower direction, the air hole 35 is located higher than an upper end 81*u* of the center tunnel 81, and no air hole 35 is located lower than the upper end 81*u* of the center tunnel 81.

In this example, the front panel 31 has air holes 35. The air holes 35 are two-dimensionally located in the plane of the front panel 31. Specifically, a portion of the front panel 31 where the air holes 35 are located has a grid shape or a mesh shape.

Figure 7:
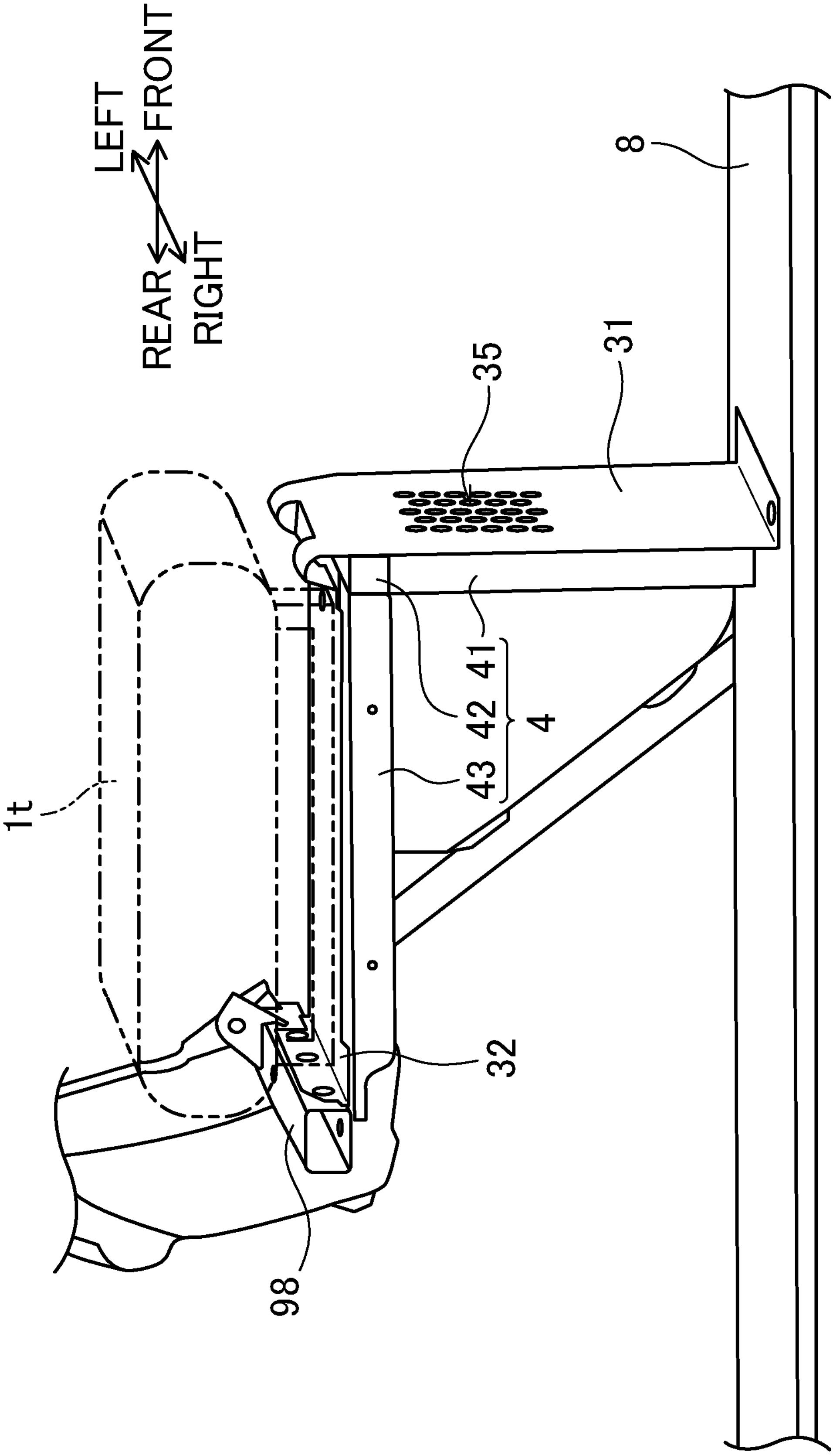
FIG. 7 is a perspective view of the front panel from the right front with the front panel cut along a plane perpendicular to a vehicle width direction.

FIG. 7 is a perspective view of the front panel 31 from the right front with the front panel 31 cut along a plane perpendicular to the vehicle width direction. In FIG. 7, the seat cushion 1*t* is indicated by a chain double-dashed line for the sake of convenience in description. In terms of a position in the front-rear direction, the front panel 31 is located in front with respect to the center of the seat cushion 1*t* in the front-rear direction. In this example, in terms of a position in the front-rear direction, the position of the front panel 31 is substantially coincident with the position of the front end of the seat cushion 1*t*. The front panel 31 is positioned in front with respect to the first frame 41. The lower end of the front panel 31 is attached to the floor 8 with a screw, for example. In terms of a position in the upper-lower direction, the upper end of the front panel 31 is positioned higher than the second frame 42.

As shown in FIG. 2, each of the top panel 32, the left side panel 33, and the right side panel 34 has a decorative panel function of hiding the seat support frame 4 from an occupant. Each of the top panel 32, the left side panel 33, and the right side panel 34 has a plate shape. Each of the top panel 32, the left side panel 33, and the right side panel 34 is made of resin, for example. In this example, the front panel 31, the top panel 32, the left side panel 33, and the right side panel 34 are integrated.

The top panel 32 extends in the front-rear direction and the vehicle width direction. As shown in FIG. 7, the top panel 32 is located above the second frame 42 and the third frames 43. The front end of the top panel 32 is coupled to the upper end of the front panel 31. The rear end of the top panel 32 is attached to the cross member 98, for example, with a rivet.

As shown in FIG. 2, the left side panel 33 extends substantially in the front-rear direction and the upper-lower direction. The upper end of the left side panel 33 is coupled to the left end of the top panel 32. The front end of the left side panel 33 is coupled to the left end of the front panel 31. As shown in FIG. 5, the left side panel 33 is located on the left with respect to the first frame 41 located on the leftmost side.

Figure 8:
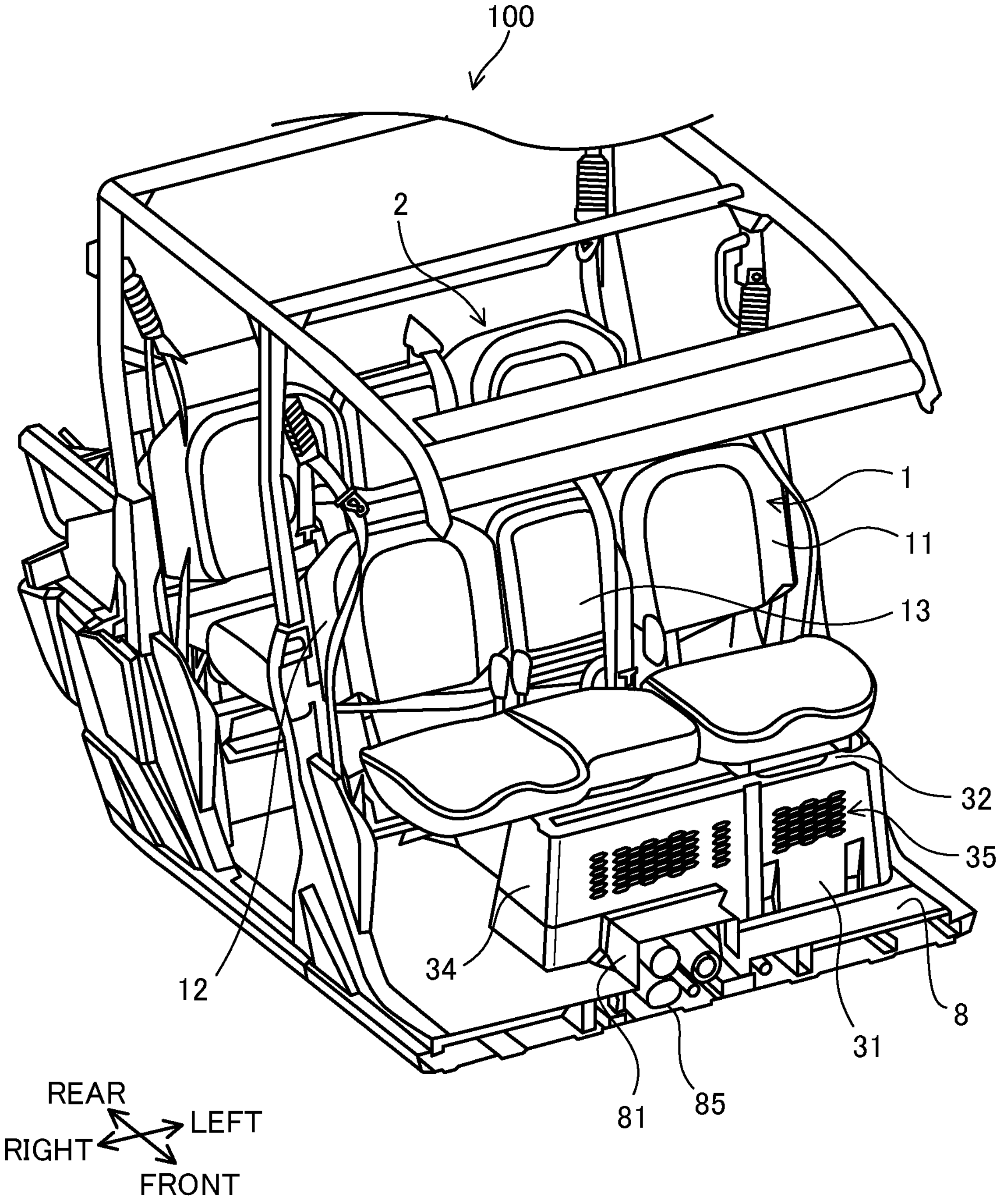
FIG. 8 is a perspective view of the vehicle interior from the right front.

FIG. 8 is a perspective view of the vehicle interior from the right front. The right side panel 34 extends substantially in the front-rear direction and the upper-lower direction. The front end of the right side panel 34 is coupled to the right end of the front panel 31. The upper end of the right side panel 34 is coupled to the right end of the top panel 32. As shown in FIG. 5, the right side panel 34 is located on the right with respect to the first frame 41 located on the rightmost side.

In the vehicle 100 as described above, conditioned air is supplied through the air outlet 60 to the space in front with respect to the front seat 1 in the vehicle interior. The conditioned air supplied to the space in front with respect to the front seat 1 flows to the rear seat 2 through the air holes 35 of the front panel 31. As a result, the conditioned air can sufficiently flow not only to the front seat 1 but also to the rear seat 2, and an air-conditioning effect for the rear seat 2 can be improved. Particularly, in this example, since the front panel 31 has the air holes 35, the air-conditioning effect for the rear seat 2 can be further improved.

In terms of a position in the vehicle width direction, the front panel 31 overlaps with the air outlet 60. Thus, conditioned air supplied through the air outlet 60 easily reaches the front panel 31, and therefore, the amount of air flowing to the rear seat 2 through the air holes 35 can be increased.

The front panel 31 further has a function of preventing, e.g., baggage from entering a space around the feet of a driver on the driver seat 11. The air holes 35 are located in the upper portion of the front panel 31, and no air holes 35 are located in the lower portion of the front panel 31. Thus, the strength of the lower portion of the front panel 31 can be improved. For example, even in a case where, e.g., baggage has moved to the front seat 1 from the rear seat 2 while the vehicle 100 is traveling, a probability of, e.g., the baggage entering the space around the feet of the driver can be reduced.

In terms of a position in the front-rear direction, the front panel 31 is located in front with respect to the center of the seat cushion 1*t* of the front seat 1 in the front-rear direction. With this configuration, a space where an occupant on the rear seat 2 can put one's feet can be ensured below the seat cushion 1*t* of the front seat 1. As a result, the comfortability of the occupant on the rear seat 2 is improved.

The front panel 31 is located partially below the seat cushion 1*t* of the passenger seat 12. With this configuration, a space for placing, e.g., baggage can be ensured below the seat cushion 1*t* of the passenger seat 12.

Other Embodiments

The embodiment has been described above as an example of the technique disclosed in the present application. However, the technique in the present disclosure is not limited to above, and is also applicable to embodiments to which changes, replacements, additions, omissions, etc. are made as necessary. The components described above in the embodiment may be combined to form a new embodiment. The components shown in the attached drawings and described in detail may include not only components essential for solving the problems, but also components that are provided for describing an example of the above-described technique and are not essential for solving the problems. Thus, description of these non-essential components in detail and illustration of these components in the attached drawings shall not be interpreted that these non-essential components are essential.

For example, the off-road vehicle is not limited to the utility vehicle 100. The off-road vehicle may be, for example, an all terrain vehicle (ATV) or a tractor. Moreover, the off-road vehicle is not limited to the four-wheeled vehicle, and for example, may be a three-wheeled vehicle.

The front seat 1 may include two seats in line without the center seat 13. Similarly, the rear seat 2 may include two seats in line without the center seat 23. In this case, the seat support frame 4 and the front panel 31 may also be located below the driver seat 11, and may also be located partially below the passenger seat 12.

The vehicle 100 does not necessarily include the top panel 32, the left side panel 33, and the right side panel 34.

In terms of a position in the vehicle width direction, the front panel 31 does not necessarily overlap with the air outlet 60. The front panel 31 is not necessarily located below the seat cushion 1*t* of the passenger seat 12. In other words, the front panel 31 may be located at a position different from that of the seat cushion 1*t* of the passenger seat 12 as viewed in plane. That is, the entirety of a space below the seat cushion 1*t* of the passenger seat 12 may be a space communicating in the front-rear direction. Conversely, the front panel 31 may be located below the seat cushion 1*t* of the passenger seat 12. That is, the front panel 31 may extend from the left end of the seat cushion 1*t* of the driver seat 11 to the right end of the seat cushion 1*t* of the passenger seat 12.

The vehicle 100 may further include a back panel located below the seat cushion 1*t* of the front seat 1 and extending upward and in the vehicle width direction from the floor 8. The back panel has a decorative panel function of hiding the seat support frame 4 from an occupant. The back panel is one example of the panel. The back panel is made of resin, for example. In terms of a position in the front-rear direction, the back panel is located in rear with respect to the center of the seat cushion 1*t* in the front-rear direction. The back panel has an air hole 35 through which conditioned air flowing rearward from a position in front with respect to the front seat 1 passes. The left end of the back panel may be coupled to the rear end of the left side panel 33, the right end of the back panel may be coupled to the rear end of the right side panel 34, and the upper end of the back panel may be coupled to the rear end of the top panel 32. The back panel may be integrated with the front panel 31, the top panel 32, the left side panel 33, and the right side panel 34.

The number, shape, and arrangement of the air holes 35 are not limited. The number of air holes 35 may be one. The shape of the air hole 35 may be a rectangular shape other than the hexagonal shape or a curved shape such as an oval shape. The air hole 35 may be located lower than a position higher than the lower end 31*d* of the front panel 31 by ⅓ of the upper-lower dimension of the front panel 31. In terms of a position in the upper-lower direction, the air hole 35 may be positioned lower than the upper end 81*u* of the center tunnel 81.

Aspects

The above-described embodiment is a specific example of the following aspects.

(First Aspect) The utility vehicle 100 (off-road vehicle) includes the front seat 1 and the rear seat 2, and the front panel 31 (panel) located below the seat cushion 1*t* of the front seat 1 and extending upward and in the vehicle width direction from the floor 8, and the front panel 31 has the air hole 35 through which conditioned air flowing rearward from the position in front with respect to the front seat 1 passes.

According to this configuration, the front panel 31 has the air hole 35 so that the conditioned air can sufficiently flow not only to the front seat 1 but also to the rear seat 2. As a result, the air-conditioning effect for the rear seat 2 can be improved.

(Second Aspect) The utility vehicle 100 of the first aspect further includes the air-conditioner 6 that supplies the conditioned air into the vehicle interior through the air outlet 60 located in front with respect to the front seat 1.

According to this configuration, the conditioned air can flow rearward from the position in front with respect to the front seat 1.

(Third Aspect) In the utility vehicle 100 of the first or second aspect, in the vehicle width direction, the front panel 31 overlaps with the air outlet 60.

According to this configuration, the conditioned air supplied through the air outlet 60 easily reach the front panel 31, and therefore, the amount of air flowing to the rear seat 2 through the air hole 35 can be increased.

(Fourth Aspect) In the utility vehicle 100 of any one of the first to third aspects, the air hole 35 of the front panel 31 includes the air holes 35.

According to this configuration, the air-conditioning effect for the rear seat 2 can be further improved.

(Fifth Aspect) In the utility vehicle 100 of any one of the first to fourth aspects, in the front-rear direction, the front panel 31 is located in front with respect to the center of the seat cushion 1*t* in the front-rear direction.

According to this configuration, the space where an occupant on the rear seat 2 can put one's feet can be ensured below the seat cushion 1*t* of the front seat 1. As a result, the comfortability of the occupant on the rear seat 2 is improved.

(Sixth Aspect) In the utility vehicle 100 of any one of the first to fifth aspects, the air hole 35 is positioned higher than the lower end 31*d* of the front panel 31 by ⅓ of the upper-lower dimension of the front panel 31 or more.

According to this configuration, no air hole 35 is located in the lower portion of the front panel 31 so that the strength of the lower portion of the front panel 31 can be improved. As a result, for example, even in a case where, e.g., baggage has moved to the front seat 1 from the rear seat 2 while the vehicle 100 is traveling, a probability of, e.g., the baggage entering the space around the feet of the driver on the driver seat 11 can be reduced.

(Seventh Aspect) In the utility vehicle 100 of any one of the first to sixth aspects, in the upper-lower direction, the air hole 35 is positioned higher than the upper end 81*u* of the center tunnel 81.

According to this configuration, no air hole 35 is located in the lower portion of the front panel 31 so that the strength of the lower portion of the front panel 31 can be improved.

(Eighth Aspect) In the utility vehicle 100 of any one of the first to seventh aspects, the front seat 1 includes the driver seat 11 and the passenger seat 12, the seat cushion is the seat cushion 1*t* of the driver seat 11, and the front panel 31 is not located below the seat cushion 1*t* of the passenger seat 12 or is located partially below the seat cushion 1*t* of the passenger seat 12.

According to this configuration, the space for placing, e.g., baggage can be ensured below the seat cushion 1*t* of the passenger seat 12.

What is claimed:

1. An off-road vehicle comprising:
a front seat and a rear seat; and
a panel located below a seat cushion of the front seat along a front end of the seat cushion, and extending upward from a floor and in a vehicle width direction,
wherein the panel is located outside a center tunnel and has at least one air hole through which conditioned air flowing rearward from a position in front with respect to the front seat passes, and
a space rearward with respect to the panel and outside the center tunnel is a flow path through which conditioned air passing through the air hole flows to the rear seat, the panel and the space being configured to regulate an air conditioning effect for the rear seat.

2. The off-road vehicle of claim 1, further comprising:
an air-conditioner that supplies the conditioned air into a vehicle interior through an air outlet located in front with respect to the front seat.

3. The off-road vehicle of claim 2, wherein
the panel and the air outlet are substantially in the same position along the vehicle width direction.

4. The off-road vehicle of claim 1, wherein
the at least one air hole of the panel includes a plurality of air holes adjacent to each other.

5. The off-road vehicle of claim 1, wherein the at least one air hole is positioned higher than a lower end of the panel by ⅓ of an upper-lower dimension of the panel or more.

6. The off-road vehicle of claim 1, wherein in terms of a position in an upper-lower direction, the at least one air hole is positioned higher than an upper end of the center tunnel.

7. The off-road vehicle of claim 1, wherein the front seat includes a driver seat and a passenger seat, the seat cushion is a seat cushion of the driver seat, and the panel is not located below the seat cushion of the driver seat, or is located below the seat cushion of the driver seat and partially below a seat cushion of the passenger seat.

8. The off-road vehicle of claim 1, wherein a space where an occupant of the rear seat can put feet of the occupant is located below the seat cushion of the front seat.

9. The off-road vehicle of claim 1, wherein there is no other panel between the at least one air hole and the rear seat.

10. The off-road vehicle of claim 1, wherein the panel includes a portion located higher than the center tunnel.

11. An off-road vehicle comprising:

a driver seat and a rear seat located in rear of the driver seat; and a panel located below a seat cushion of the driver seat along a front end of the seat cushion, and extending upward from a floor and in a vehicle width direction, wherein the panel is located outside a center tunnel and has at least one air hole through which conditioned air flowing rearward from a position in front with respect to the front seat passes, and a space rearward with respect to the panel and outside the center tunnel is a flow path through which conditioned air passing through the at least one air hole flows to the rear seat, the panel and the space being configured to regulate an air conditioning effect for the rear seat.

* * * * *